(12) United States Patent
Rubin et al.

(10) Patent No.: US 8,867,568 B2
(45) Date of Patent: Oct. 21, 2014

(54) METHOD FOR PARSING NETWORK PACKETS HAVING FUTURE DEFINED TAGS

(75) Inventors: Lawrence Howard Rubin, Austin, TX (US); Harish Kumar Shakamuri, Austin, TX (US)

(73) Assignee: Emulex Corporation, Costa Mesa, CA (US)

( * ) Notice: Subject to any disclaimer, the term of this patent is extended or adjusted under 35 U.S.C. 154(b) by 256 days.

(21) Appl. No.: 13/284,447

(22) Filed: Oct. 28, 2011

(65) Prior Publication Data

US 2013/0107892 A1    May 2, 2013

(51) Int. Cl.
*H04J 3/24* (2006.01)
*H04L 29/06* (2006.01)
*H04L 29/08* (2006.01)

(52) U.S. Cl.
CPC ............... *H04L 69/22* (2013.01); *H04L 69/12* (2013.01); *H04L 69/324* (2013.01)
USPC .......................................... 370/474; 709/228

(58) Field of Classification Search
CPC ....... H04L 69/22; H04L 69/12; H04L 69/324; H04J 3/24
USPC .......................................... 370/474; 709/228
See application file for complete search history.

(56) References Cited

U.S. PATENT DOCUMENTS

| | | | | |
|---|---|---|---|---|
| 8,031,709 | B2 * | 10/2011 | Alexander, Jr. | 370/389 |
| 2007/0043849 | A1 * | 2/2007 | Lill et al. | 709/224 |
| 2011/0058573 | A1 * | 3/2011 | Balakavi et al. | 370/463 |

* cited by examiner

*Primary Examiner* — Wei Zhao
(74) *Attorney, Agent, or Firm* — McAndrews, Held & Malloy, Ltd.

(57) ABSTRACT

Disclosed herein is a method allowing an existing or legacy network device to recognize and parse packets defined in accordance with future-defined standards without having to be re-configured to be compatible with such standards. In particular, the device can skip past unknown or newly-inserted fields, such as tag headers in a tagged packet, to parse and process the remainder of the packet. By skipping those added fields such as a tag header, the device can accommodate various future-defined standards without incurring additional engineering or design costs or compromising packet processing efficiency.

17 Claims, 8 Drawing Sheets

METHOD FOR PARSING NETWORK PACKETS HAVING FUTURE DEFINED TAGS

FIELD OF THE INVENTION

This relates to data transfer and processing in computer networks such as the Ethernet, and more particularly, to parsing network packets in which additional information such as a tag header is inserted according to future-defined standards and protocols.

BACKGROUND OF THE INVENTION

Figure 1A:
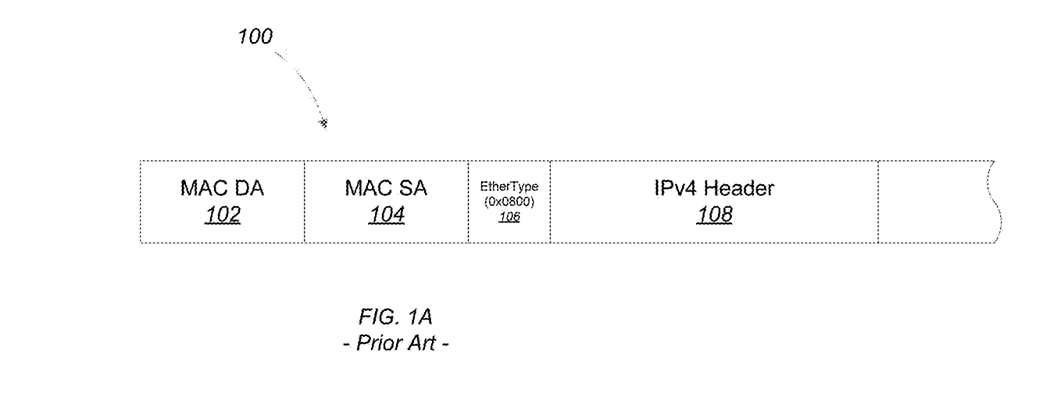
FIG. 1A illustrates an exemplary packet frame in the existing network systems.

One way of transmitting a packet defined in accordance with an existing network protocol (e.g., a Fibre Channel packet) over the Ethernet network is to encapsulate such a packet in the payload portion of an Ethernet frame. As a result, the Ethernet frame with the packet encapsulated therein typically contains an EtherType field that indicates the type of the protocol of the encapsulated packet. For example, FIG. 1A illustrates an exemplary packet frame 100 in which an Internet Protocol (IP) packet is encapsulated or embedded. As can be seen, this frame 100 includes different fields, such as the Media Access Control (MAC) destination address 102 and the MAC source address 104, which identify the destination of the packet and the source of the packet, respectively, in the network. Usually following the MAC source address 104 is the EtherType field, i.e., EtherType 106, as shown in FIG. 1A. In this example, the EtherType 106 has a value of 0x0800, which indicates the encapsulated or embedded packet protocol is Internet Protocol version 4 (IPv4). Accordingly, the EtherType 106 is followed by an IPv4 header 108. Different values in the EtherType field identify different packet protocols encapsulated or embedded in the frame. For example, if the EtherType has a value of 0x8906, that means the protocol is Fibre Channel over Ethernet (FCoE), and if the EtherType is 0x86DD, the identified protocol is Internet Protocol version 6 (IPv6).

When a network packet, such as the one illustrated in FIG. 1A, is received at a device in the network, the device may delegate the packet processing task to some dedicated hardware, typically a particular protocol offload engine, if the received packet has an EtherType indicating the encapsulated packet is of a certain protocol. For example, a Transmission Control Protocol (TCP) Offload Engine (TOE) in a network interface card (NIC) may be dedicated for processing TCP/IP stacks. Likewise, converged network adapters (CNAs) may have dedicated hardware or firmware for processing FCoE packets. Alternatively, the network device may use a software module or software client, such as a driver program, to perform parsing and other processing functions of the received packet. Generally speaking, using dedicated hardware for processing packets can add costs, but is significantly faster and more efficient than the software approach. Therefore, the dedicated hardware solution is generally more desirable in storage area networks (SANs) where speed is an essential concern. In operation, both hardware and software approaches are utilized in a network device when parsing and processing a received network packet.

Figure 1B:
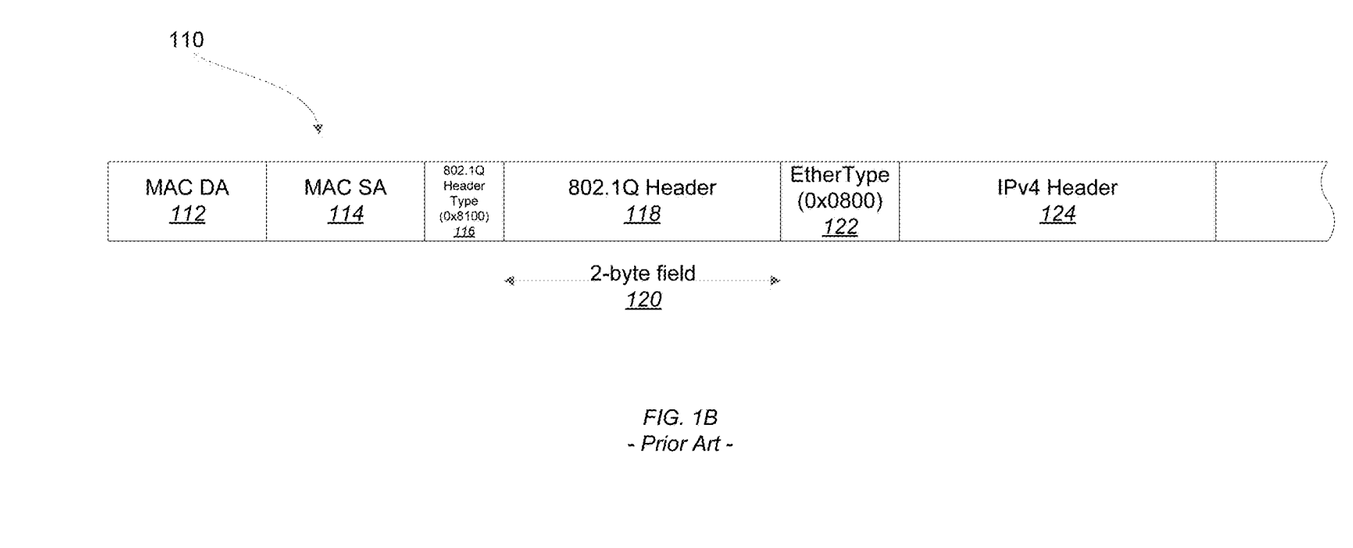
FIG. 1B illustrates an exemplary packet frame with an 802.1Q tag header inserted therein.
Figure 1C:
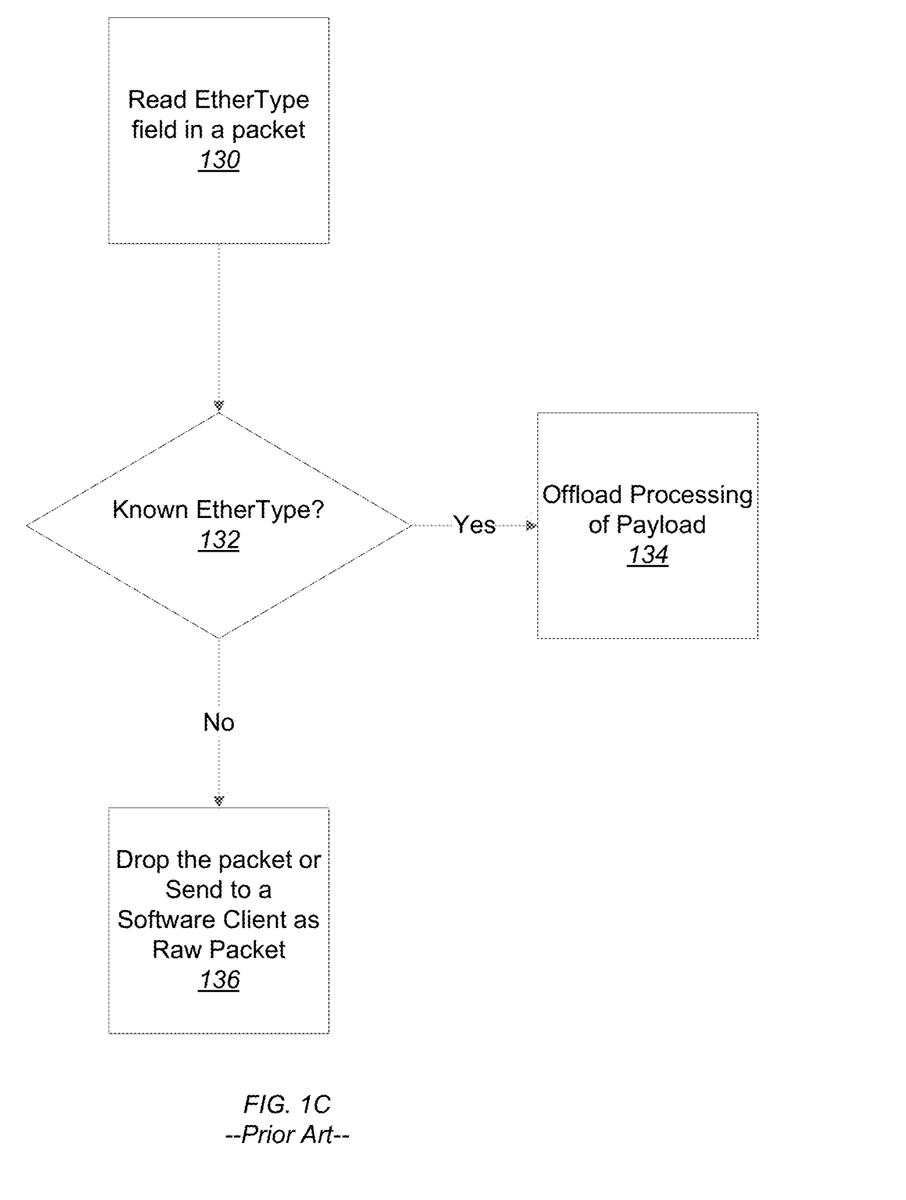
FIG. 1C is a flow chart illustrating an exemplary process of parsing a network packet in existing network devices.

FIG. 1C is a flow chart illustrating an exemplary process of parsing a network packet in existing network devices. Starting at step 130, the device receiving the packet reads the EtherType field in the received packet to identify the packet type. Because the EtherType field is in a defined portion of the packet, i.e., usually following the MAC Source Address as shown in FIG. 1A, the device can quickly identify and read the EtherType from the receive packet. Then the device determines at step 132 whether the packet is of a known EtherType or network protocol. If so, the process proceeds to step 134, where the device offloads the processing of the packet to some dedicated hardware. Otherwise, the process continues to step 136, where the device sends the packet as a raw packet to a software client for further processing.

An existing packet frame as shown in FIG. 1A may be modified to include additional fields according to newly-developed standards and protocols. However, adding these fields may confuse the device when the device is trying to read the EtherType field from a received packet in the above-described process in FIG. 1C. For instance, the IEEE 802.1Q standard adds a tag header into the packet frame for storing additional information about the packet, such as a virtual local area network (VLAN) identifier. As illustrated in FIG. 1B, an exemplary packet frame 110 with an 802.1Q tag header inserted therein includes two additional fields, namely, an 802.1Q tag header type 116 and an 802.1Q tag header 118. The 802.1Q tag header 118 takes two bytes in the frame, as can be indicated by the 802.1Q tag header type 116. These fields are typically inserted between the MAC source address 114 and the EtherType 122. As a result, the EtherType 122 is no longer positioned right after the MAC source address 114. If the network device is not appropriately re-configured to be compatible with the 802.1Q protocol, it will not be able to recognize the inserted fields 116 and 118, as the device still expects to read the EtherType field following the MAC source address 114. As illustrated in FIG. 1C, the 802.1Q tag header type 0x8100 may be considered to be an unrecognized EtherType, as a valid EtherType is expected to be 0x0800. As a result, without reading the packet further to identify the EtherType 122, the receiving device would either drop the packet as an invalid packet or send the packet to a software client as a raw packet. In either case, the device will not be able to receive the benefit of hardware processing. Accordingly, there is a need for existing network devices to be able to recognize and read the EtherType field from any future-defined or modified packet frame, albeit how many additional fields, such as one or more tag headers, are inserted in the packet frame.

SUMMARY OF THE INVENTION

This relates to allowing an existing or legacy network device to recognize and parse packets defined in accordance with future-defined standards without having to be re-configured to be compatible with such standards. In particular, the device can skip past unknown or newly-inserted fields, such as tag headers in a tagged packet, to parse and process the remainder of the packet. In one embodiment, when parsing a tagged packet, a parser in the device can skip a tag header based on the tag header type, which usually indicates a fixed or pre-defined length of the tag header, and continue to read an EtherType field past the tag header. Based on the EtherType, the device can recognize the encapsulated protocol and offload further processing of the packet to appropriate dedicated hardware for efficiency. By skipping those added fields such as a tag header, the device can accommodate various future-defined standards without incurring additional engineering or design costs or compromising packet processing efficiency.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention allow an existing or legacy network device to recognize and parse packets defined in accordance with future-defined standards without having to be re-configured to be compatible with such standards. In particular, the device can skip past unknown or newly-inserted fields, such as tag headers in a tagged packet, to parse and process the remainder of the packet. In one embodiment, when parsing a tagged packet, a parser in the device can skip a tag header based on the tag header type, which usually indicates a fixed or pre-defined length of the tag header, and continue to read an EtherType field past the tag header. Based on the EtherType, the device can recognize the encapsulated protocol and offload further processing of the packet to appropriate dedicated hardware for efficiency. By skipping those added fields such as a tag header, the device can accommodate various future-defined standards without incurring additional engineering or design costs or compromising packet processing efficiency.

Although embodiments of the invention may be described and illustrated herein using tag headers under 802.1Q as examples, it should be understood that embodiments of this invention are not so limited, but are applicable to many future-developed or defined standards and protocols. Additionally, embodiments of the invention are not limited to Ethernet networks and are compatible with any networking protocol that uses an enumerated field to indicate what type of content follows within a packet or byte stream. Also, embodiments of the invention can be implemented in a host bus adapter (HBA), a converged network adapter (CNA), a network interface card (NIC), target channel adapter (TCA), or any other similar device that enables hardware offloading of packet processing.

Figure 2:
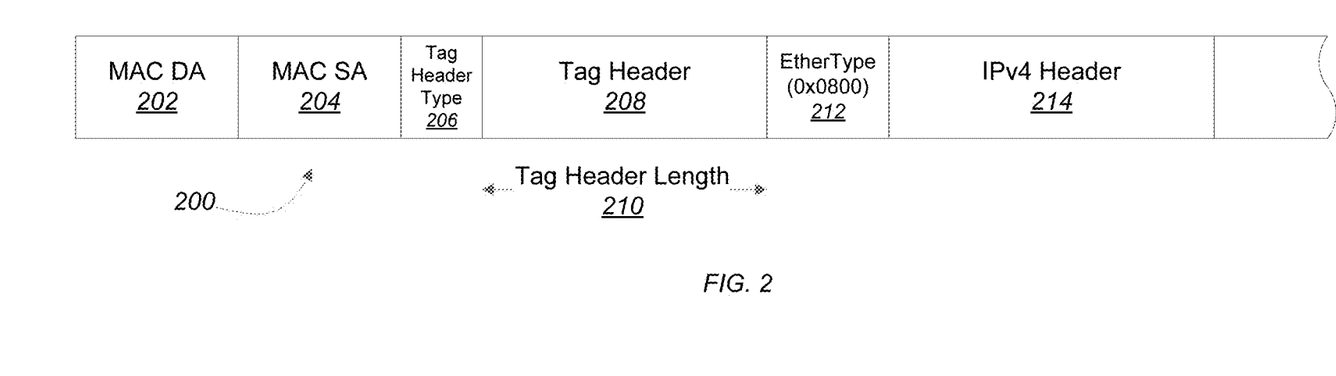
FIG. 2 illustrates an exemplary packet frame with scalability to include additional fields such as one or more tag headers according to various embodiments of the invention.

Referring now to FIG. 2, an exemplary packet frame with scalability to include additional fields such as one or more tag headers will be described. As seen in FIG. 2, the tag header type 206 of the packet 200 identifies the type of the tag header 208 to be an 802.1Q tag header. Because all tag headers of a given tag header type typically have the same fixed or pre-defined length, the tag header type 206 can be used to determine conclusively the tag header length 210. In this example, the tag header type indicates that the tag header is an 802.1Q tag header, which is known to be 2 bytes long. Accordingly, a device receiving the packet can bypass the tag header 208 and continue to read the EtherType 212 of the tagged packet 200.

Figure 3:
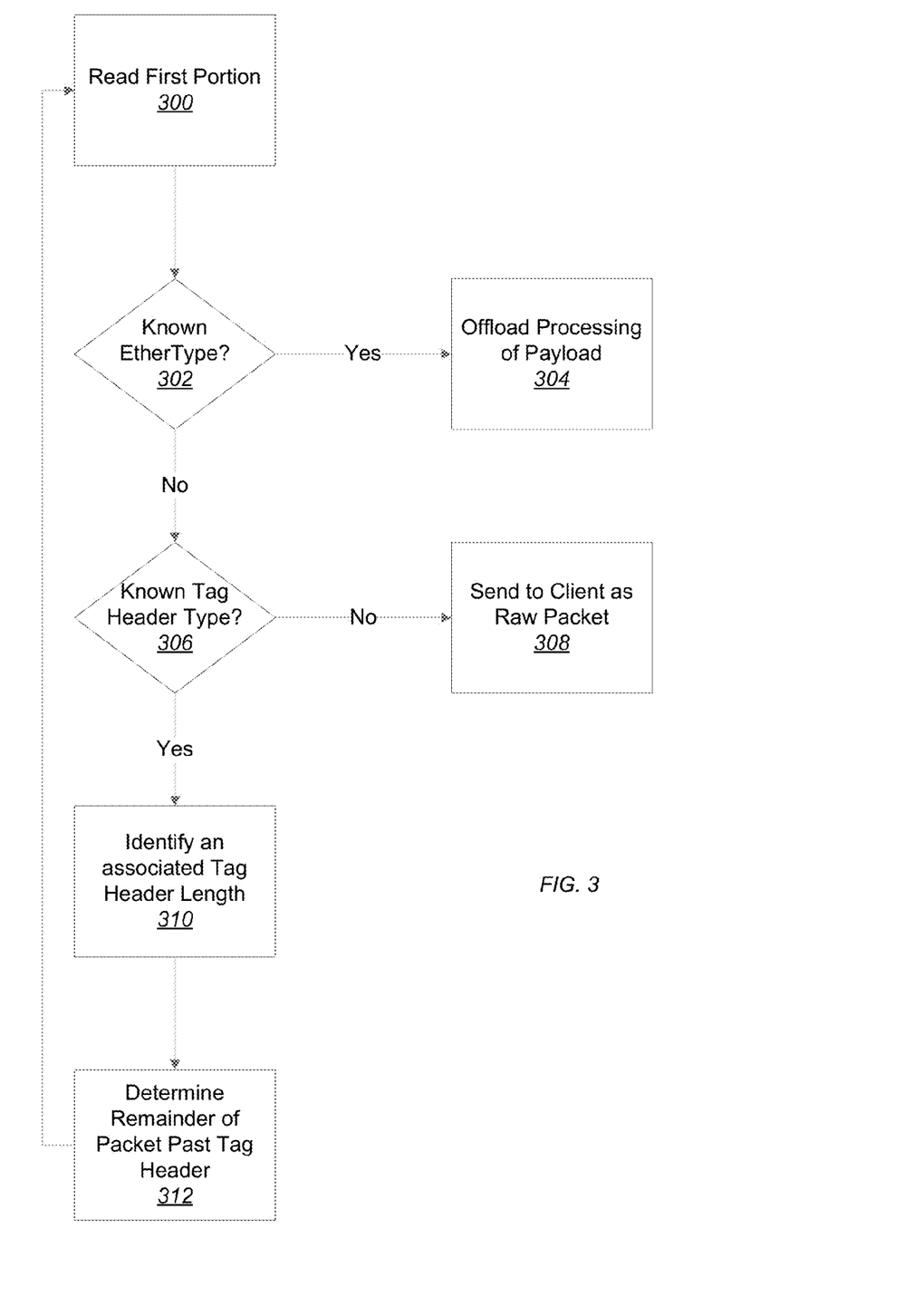
FIG. 3 is a flow chart illustrating an exemplary method of parsing a network packet of FIG. 2 according to various embodiments of the invention.

FIG. 3 is a flow chart illustrating an exemplary method of parsing a network packet with one or more tag headers inserted therein. Such a parsing method can be performed by different components in a network device, which will be described in detail later with reference to FIG. 4. As shown in FIG. 3, when a device receives the network packet, at step 300 the device reads a first portion of the packet, for example, the portion immediately following the MAC source address field. As aforementioned, this first portion contains either an EtherType or a tag header type, depending on the structure of the packet frame. For example, the first portion of exemplary packet frame 100 in FIG. 1A contains the EtherType 106, while the first portion of exemplary packet frame 110 in FIG. 1B contains the 802.1Q header type 116.

At step 302, the device determines whether the first portion of the packet contains a known EtherType. If so, the device can proceed with offloading the processing of the packet to dedicated hardware at step 304. For example, the parser of the network device may recognize the EtherType as indicating an IP packet being encapsulated in the received packet, as illustrated in FIG. 1A, and thus sends the packet to a TCP/IP stack or processing engine within the network device. Traditionally, the device would simply drop the packet as a defective or invalid packet or send it to a software client as a raw packet if the first portion does not include any known EtherType. However, it is possible that the packet is valid but structured differently according to a newly-defined protocol that inserts tag headers or other fields in the first portion. Thus, the process in FIG. 3 performs further parsing of the received packet to identify the EtherType in a different portion of the packet, as will be described below.

In one embodiment, if the first portion is not a known EtherType, the device further determines at step 306 whether the first portion contains a known tag header type. For example, the first portion may contain a tag header type indicating the inserted tag header is an 802.1Q header, as shown in FIG. 1B. But if the first portion does not include any known tag header type, the packet will be sent as a raw packet to a software client for further parsing at step 308. Typically, a software client includes a network driver or software programmed to execute packet parsing algorithms.

Figure 4:
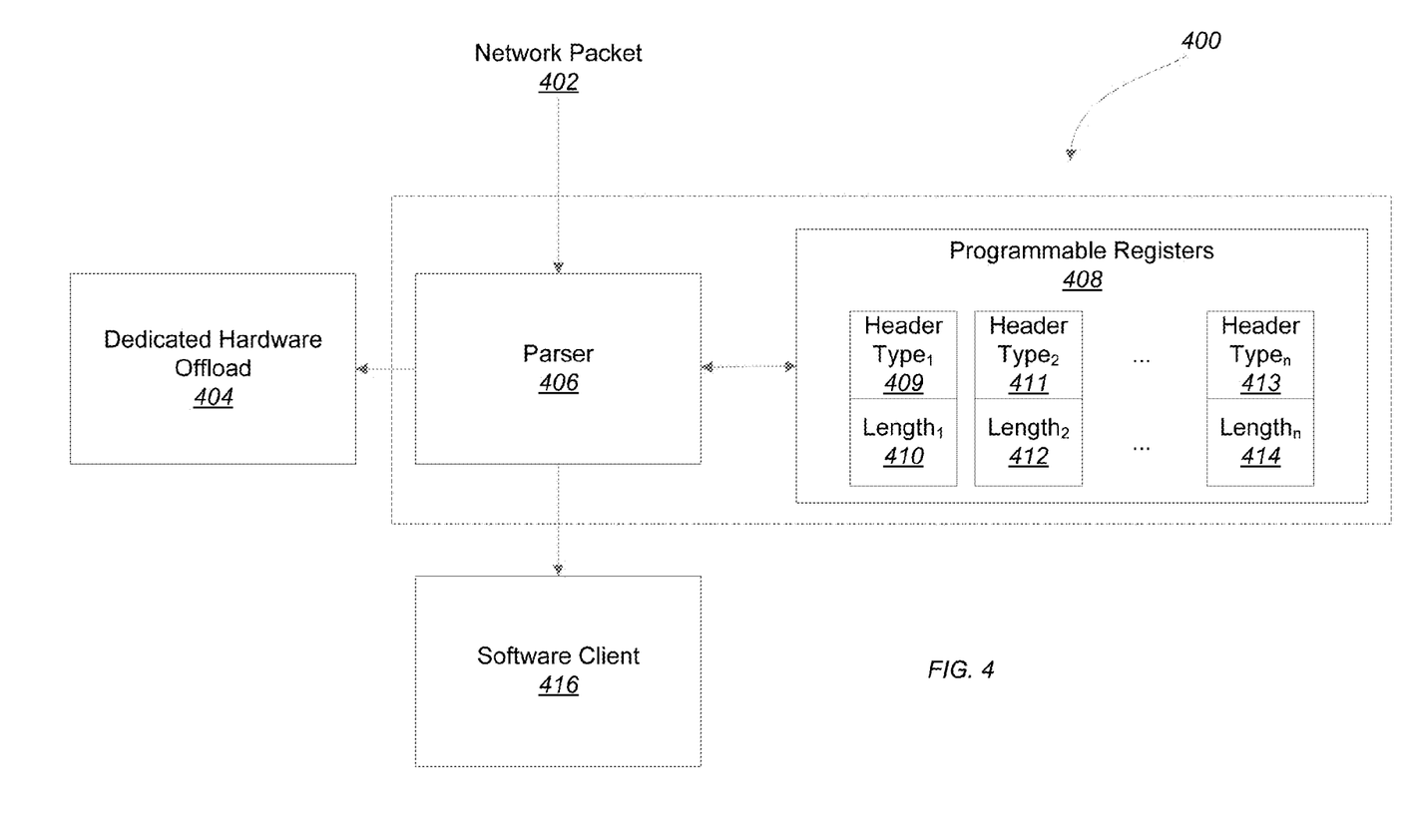
FIG. 4 illustrates an exemplary network device capable of implementing various embodiments of the invention.

If the first portion is a known tag header type, the device proceeds to step 310 to determine a tag header length associated with the tag header type so that the parser in the device can bypass the inserted tag header to read the remainder of the packet. In one configuration, the device may include one or more programmable registers (as shown in FIG. 4) for storing different tag header lengths associated with their respective tag header types. Such associations can be implemented through tables or databases as will be described later with reference to FIGS. 6A-B.

Once the tag header length is determined from the associated tag header type, the parser in the device can determine the remainder of the packet at step 312. Using the example in FIG. 2, the parser can bypass the tag header 208, i.e., a length 210 of the frame, to identify the remainder of the packet starting at the EtherType field 212. The remainder of the packet past the tag header may include additional tag headers followed by the EtherType and payload. In that case, the parser in the device can repeat the steps 300-312 to identify and bypass other inserted tag headers until a known EtherType is identified.

According to some embodiments, the processing of the packet can depend on the tag header type. For example, a network device can drop all packets of a certain tag header type, hardware offload can be disallowed for packets of a certain tag header type, or packets of a certain tag header type can be sent to a programmable receive client. According to some embodiments, network devices can process a packet in this way only based on the tag header type with no capability to interpret or process the tag header. For example, a network device with no capability to interpret an 802.1Q tag header can nonetheless recognize an 802.1Q tag header type. Such a device can recognize and then drop all packets with an 802.1Q tag header type, even though it has no capability to interpret or process an 802.1Q tag header. In this way, devices that lack hardware to interpret or process future-defined tag headers can still process packets containing such tag headers based only on the tag header type.

The algorithm in FIG. 3 can be implemented in an exemplary network device as illustrated in FIG. 4. Such a network device 400 includes a parser 406 for receiving and parsing a network packet 402. In parsing the network packet 402, the parser 406 is configured to implement the above-described process of bypassing certain portions of the packet (e.g., inserted tag headers) to identify the EtherType in the network packet 402. If the first portion of the packet contains a known EtherType, then further processing of the packet is offloaded to the dedicated hardware 404. If the first portion does not contain a known EtherType but one of the known tag header types, such as 409, 411, or 413, then the parser will access the programmable registers 408 to retrieve the appropriate tag length associated with the tag header type. For example, if length$_1$ 410 is determined to be the tag length associated with the identified tag header type$_1$ 409, the parser 406 will bypass the tag header in the network packet 402 by skipping a length$_1$ 410 after the first portion. If the first portion of the packet does not include either a known EtherType or a known tag header type, the packet is sent as a raw packet to a software client 416 coupled to the parser 406.

Figure 6A:
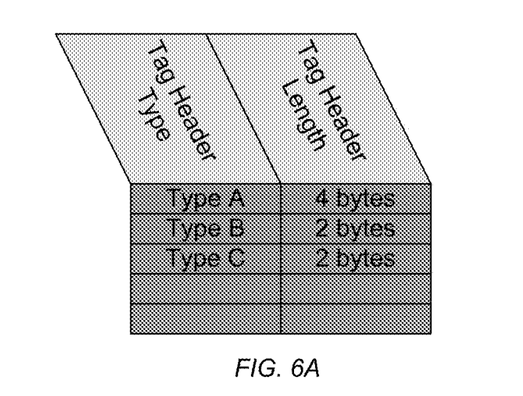
FIGS. 6A and 6B illustrate exemplary tables in which different tag header types are associated with their respective tag header lengths.
Figure 6B:
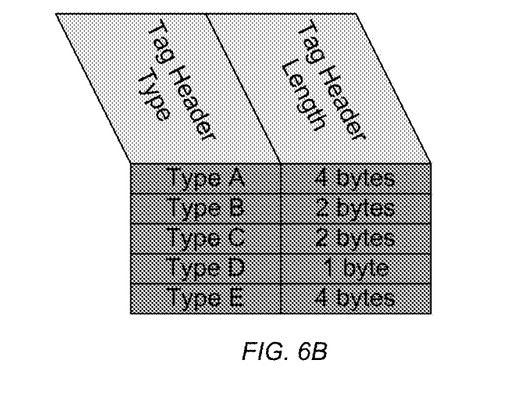

In one embodiment, the various lengths 410, 412 and 414 in the programmable registers 408 can be pre-defined tag lengths according to respective network protocols. Alternatively, these lengths stored in the programmable registers 408 can be updated dynamically each time a new tag header type is added. For instance, the tables in FIGS. 6A-B illustrate exemplary tag header types associated with different tag header lengths. In FIG. 6A, tag header type A is defined as having a tag header length of 4 bytes, tag header type B is defined as having a tag header length of 2 bytes, and tag header type C is defined as having a tag header length of 2 bytes. This table in FIG. 6A can be updated when additional tag header types are included. FIG. 6B shows such an updated table when tag header types D and E have been added, with lengths of 1 byte and 4 bytes, respectively.

Figure 5:
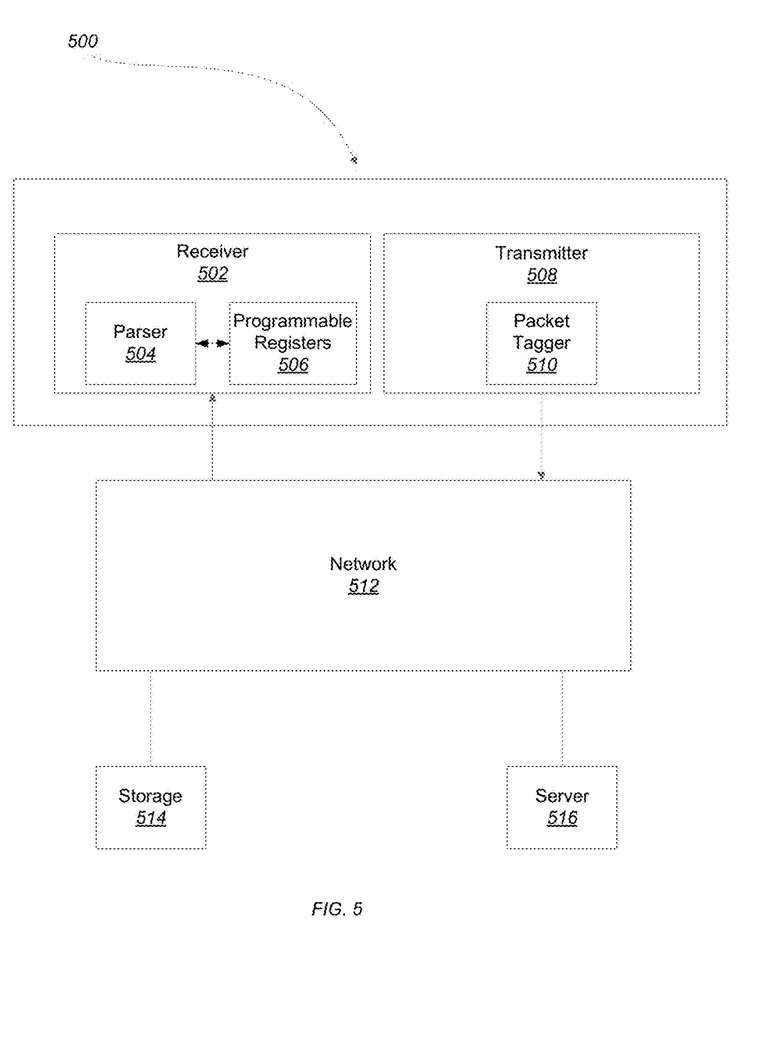
FIG. 5 illustrates an exemplary network environment in which various embodiments of the invention can be implemented.

FIG. 5 illustrates an exemplary computer network environment in which the network device in FIG. 4 can operate and communicate with other network elements according to various network protocols. In FIG. 5, the network device 500 communicates with other devices on the network 512, such as storage or target devices 514 and a server 516. Within the network device 500, incoming packets are received at the receiver 502, which includes a parser 504 and programmable registers 506. As aforementioned, the receiver 502 can be configured to carry out the packet-parsing method as illustrated in FIG. 3. On the other hand, outgoing packets are prepared and sent out to the network by the transmitter 508 in the network device 500. In one embodiment, the transmitter 508 includes a packet tagger 510 for building a network packet with one or more inserted tag headers before sending the packet off to the network. This packet with tag headers inserted therein can then be received and interpreted by other network devices that are similarly configured as the demonstrated network device 500.

Figure 7:
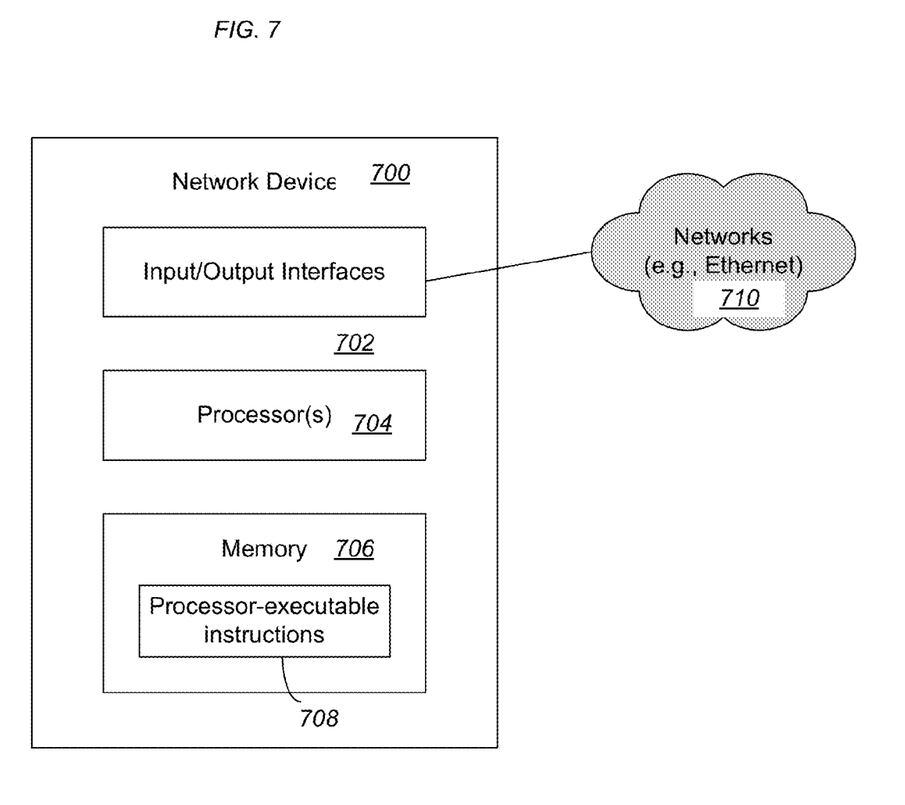
FIG. 7 is a block diagram of an exemplary configuration of a network device capable of implementing various embodiments of the invention.

FIG. 7 is a block diagram of an exemplary configuration of a network device 700. As illustrated in FIG. 7, the network device 700 includes one or more input/output (I/O) interfaces 702, at least one processor 704, and memory space 706. The I/O interfaces 702 enable the network device 700 to communicate over one or more networks 710, such as an Ethernet network that enables different network protocols such as Fibre Channel (FC), Fibre Channel over the Ethernet (FCoE), SAS, TCP/IP, and so forth. The I/O interfaces 702 include interfaces such as a network interface card, a modem, a USB connector, one or more network ports (e.g., Ethernet_Port), and some combination thereof.

Processor(s) 704 may be implemented using any applicable processing-capable technology. Processor(s) 704 may be one or more processors such as central processing units (CPUs), microprocessors, controllers, dedicated processing circuits, digital signal processors (DSPs), processing portion(s) of an ASIC, some combination thereof, and so forth. Generally, processors 704 are capable of executing, performing, and/or otherwise effectuating processor-executable instructions, such as processor-executable instructions 708 in the memory 706.

The memory 706 comprises portions of computer-readable storage media, which may include volatile and non-volatile media, removable and non-removable media, storage and transmission media, and so forth. The memory 706 is tangible media when it is embodied as a manufacture and/or a composition of matter. By way of example only, storage media may include an array of disks or flash memory for longer-term mass storage of processor-executable instructions, random access memory (RAM) for shorter-term storing of instructions that are currently being executed and/or otherwise processed, hard-coded logic media (e.g., an application-specific integrated circuit (ASIC), a field programmable gate-array (FPGA), etc.), some combination thereof, and so forth. Transmission media may include link(s) on networks for transmitting communications and so forth.

In one embodiment, the memory 706 is comprised of one or more processor-accessible media, such as the processor-executable instructions 708 that are executable by the processor 702 to enable the network device 700 to perform the various functions and operations described herein, including (by way of example only) any of those that are associated with the illustrated features, aspects, components, and flow diagrams of FIG. 1-5. It should be noted that processor(s) 702 and memory 706, including the processor-executable instructions 708 thereof, may be integrated on a single chip or otherwise interwoven.

A network switch can be configured in a way similar to the above-described exemplary network device 700, except that the processor-executable instructions implemented therein enable the network switch to perform additional functions and operations described herein, such as acceptance or rejection of network device registration, traffic forwarding between different Network devices, etc. The network switch may include various components as defined by the Network and FC standards and customized by different vendors.

In practice, the methods, processes or steps described herein may constitute one or more programs made up of machine-executable or computer-executable instructions. The above description, particularly with reference to the steps and flow chart in FIG. 3, enables one skilled in the art to develop such programs, including such instructions to carry out the operations represented by logical blocks on suitably-configured processors. The machine-executable instructions may be written in a computer programming language or may be embodied in firmware logic or in hardware circuitry. If written in a programming language conforming to a recognized standard, such instructions can be executed on a variety of hardware platforms for interfacing with a variety of operating systems. Embodiments of the present invention are not described with reference to any particular programming language, but it will be appreciated that a variety of programming languages may be used to implement the teachings of the invention as described herein. Furthermore, it is common in the art to speak of software, in one form or another (e.g., program, procedure, process, application, module, logic), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein. In addition, one of ordinary skill in the art will recognize that the terms "computer-readable storage medium" or "machine readable medium" include memory space and any type of storage device accessible by a processor.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for parsing a packet, comprising:
   reading a first portion of the packet:
   determining the first portion contains a tag header type that indicates at least a tag header is inserted in the packet, wherein the tag header is not part of the first portion and the tag header type is associated with a tag header length of the tag; and
   bypassing without reading the tag header inserted in the packet, based on the tag header length associated with the tag header type, to identify and read a remaining portion of the packet.

2. The method according to claim 1, further comprising storing one or more tag header lengths in programmable registers of a device receiving the packet.

3. The method according to claim 2, wherein the programmable registers can be dynamically updated to store a new tag header length associated with a new tag header type.

4. The method according to claim 1, wherein the identified remaining portion of the packet includes an indication of which type of network frame is encapsulated in the packet.

5. The method according to claim 4, further comprising offloading processing of the packet to hardware dedicated for processing the type of network frame that is encapsulated in the packet.

6. The method according to claim 1, further comprising
   reading a second portion of the identified remaining portion of the packet; determining the second portion contains an additional tag header type that indicates an additional tag header is inserted in the packet, wherein the additional tag header is associated with an additional header length of the additional tag header; and
   bypassing the additional tag header inserted in the packet based on the additional header length associated with the additional tag header type.

7. The method according to claim 1, further comprising determining whether the first portion of the packet contains an EtherType indicating which type of network frame is encapsulated in the packet, and if so, offloading processing of the packet to hardware dedicated for processing the type of network frame.

8. The method according to claim 1, further comprising sending the packet to a software client if the first portion of the packet does not contain any tag header type or EtherType indicating which type of network frame is encapsulated in the packet.

9. A device for parsing network packets, comprising:
   a parser configured to read a first portion of a packet;
   determine the first portion. contains a tag header type that indicates at least a tag header is inserted in the packet, wherein the tag header is not part of the first portion and the tag header type is associated with a tag header length of the tag; and
   bypass without reading the tag header inserted in the packet, based on the tag header length associated with the tag header type, to identify and read a remaining portion of the packet.

10. The device according to claim 9, further comprising one or more programmable registers configured for storing one or more tag header lengths.

11. The device according to claim 10, wherein the programmable registers can be dynamically updated to store a new tag header length associated with a new tag header type.

12. The device according to claim 9, the device incorporated into a host bus adapter (HBA).

13. The device according to claim 9, the device incorporated into a converged network adapter (CNA).

14. The device according to claim 9, the device incorporated into a target channel adapter (TCA).

15. The device according to claim 9, the device incorporated into a network interface card (NIC).

16. A non-transitory computer-readable storage medium comprising processor-executable instructions, said instructions, while executed, causing a processor to:
   read a first portion of a packet;
   determine the first portion contains a tag header type that indicates at least a tag header is inserted it the packet, wherein the tag header is not part of the first portion and the tag header type is associated with a tag header length of the tag; and
   bypass without reading the tag header inserted in the packet, based on the tag header length associated with the tag header type, to identify and read a remaining portion of the packet.

17. A network including one or more servers, at least one of the servers having a network interface card (NIC) including a device for parsing network packets comprising:
   a parser configured to
   read a first portion of a packet;
   determine the first portion contains a tag header type that indicates at least a tag header is inserted in the packet, wherein the tag header is riot part of the first portion and the tag header type is associated with a tag header length of the tag; and bypass without reading the tag header inserted in the packet, based on the tag header length associated with the tag header type, to identify and read a remaining portion of the packet.

\* \* \* \* \*